(12) United States Patent
Rivard et al.

(10) Patent No.: US 10,035,533 B2
(45) Date of Patent: Jul. 31, 2018

(54) QUICK-RELEASE ATV SKIS

(71) Applicants: Gregory A. Rivard, Taylors Falls, MN (US); Justin G. Rivard, Danbury, WI (US)

(72) Inventors: Gregory A. Rivard, Taylors Falls, MN (US); Justin G. Rivard, Danbury, WI (US)

( * ) Notice: Subject to any disclaimer, the term of this patent is extended or adjusted under 35 U.S.C. 154(b) by 0 days.

(21) Appl. No.: 15/285,433

(22) Filed: Oct. 4, 2016

(65) Prior Publication Data

US 2017/0021853 A1    Jan. 26, 2017

Related U.S. Application Data

(60) Continuation of application No. 14/861,926, filed on Sep. 22, 2015, now Pat. No. 9,457,831, which is a division of application No. 13/960,759, filed on Aug. 6, 2013, now Pat. No. 9,139,216, which is a continuation-in-part of application No. 13/855,884, filed on Apr. 3, 2013, now Pat. No. 8,739,913, which is a continuation of application No. 13/027,231, filed on Feb. 14, 2011, now Pat. No. 8,418,792.

(Continued)

(51) Int. Cl.
| | |
|---|---|
| *B62B 13/18* | (2006.01) |
| *B62B 19/02* | (2006.01) |
| *B62M 27/02* | (2006.01) |
| *B62K 5/01* | (2013.01) |
| *B62K 13/00* | (2006.01) |

(52) U.S. Cl.
CPC .............. *B62B 13/18* (2013.01); *B62B 19/02* (2013.01); *B62K 5/01* (2013.01); *B62K 13/00* (2013.01); *B62M 27/02* (2013.01); *B62M 2027/021* (2013.01); *B62M 2027/025* (2013.01); *B62M 2027/027* (2013.01)

(58) Field of Classification Search
CPC ......... B62B 13/18; B62B 19/02; B64C 25/52; B62M 27/02
See application file for complete search history.

(56) References Cited

U.S. PATENT DOCUMENTS

| | | | | |
|---|---|---|---|---|
| 1,694,215 A | * | 12/1928 | Golembiewski | ........ B62B 19/02 180/183 |
| 3,252,533 A | * | 5/1966 | Aeder | .................... B62M 27/02 180/185 |

(Continued)

*Primary Examiner* — Kevin Hurley
*Assistant Examiner* — Michael R Stabley
(74) *Attorney, Agent, or Firm* — Albert W. Watkins

(57) ABSTRACT

Quick-release skis couple to the front wheels of an ATV or other wheeled vehicle, to permit the ATV to travel over snow. The rear ATV wheels may be left unaltered, or more commonly, tracks may be substituted for the rear wheels. The ski coupling includes a drive-on runner and coupling having in one embodiment width-adjustable side walls, an over-center clamp, and a lock for securing the over-center clamp. In a second embodiment, a pivotal tire cage allows the ATV tire to be driven onto the ski, but simply by forward travel of the tire the cage pivots to constrain the tire thereon. A strap then binds the tire and cage to ensure the tire stays in place on the ski. In a third embodiment, an ATV track is converted to a runner by the application and tensioning of a ski. Additional embodiments are illustrated.

13 Claims, 11 Drawing Sheets

Related U.S. Application Data

(60) Provisional application No. 61/680,269, filed on Aug. 6, 2012, provisional application No. 61/326,217, filed on Apr. 20, 2010.

(56) References Cited

U.S. PATENT DOCUMENTS

| | | | | |
|---|---|---|---|---|
| 3,321,211 A * | 5/1967 | Bryant | ............... | B62B 19/02 280/13 |
| 3,336,994 A * | 8/1967 | Pederson | ............... | B62B 13/18 180/185 |
| 3,480,289 A * | 11/1969 | Larkin | ............... | B60F 3/0076 180/183 |
| 3,542,145 A * | 11/1970 | Proffer | ............... | B62M 7/00 152/400 |
| 3,630,301 A * | 12/1971 | Henricks | ............... | B62K 13/00 180/183 |
| 3,774,926 A * | 11/1973 | Chase | ............... | B62B 19/02 280/13 |
| 3,893,527 A * | 7/1975 | Walker | ............... | B62M 29/00 180/16 |
| 3,901,525 A * | 8/1975 | O'Brien | ............... | B62B 19/04 180/183 |
| 4,390,151 A * | 6/1983 | Schneider | ............... | B64C 25/52 180/183 |
| 4,577,876 A * | 3/1986 | Harris | ............... | B62B 19/02 280/13 |
| 4,719,982 A * | 1/1988 | Shaver | ............... | B62B 19/04 180/183 |
| 4,719,983 A * | 1/1988 | Bruzzone | ............... | B62K 13/00 180/183 |
| 5,332,058 A * | 7/1994 | Bianco | ............... | B62M 27/02 180/10 |
| 6,682,082 B1 * | 1/2004 | Dalen | ............... | B60P 3/36 280/10 |
| 6,983,943 B2 * | 1/2006 | Ouellette | ............... | B62B 13/18 280/28 |
| 7,055,779 B1 * | 6/2006 | Discher | ............... | B64C 25/52 180/183 |
| 7,163,209 B2 * | 1/2007 | Moscaret | ............... | B62B 13/04 280/14.28 |

* cited by examiner

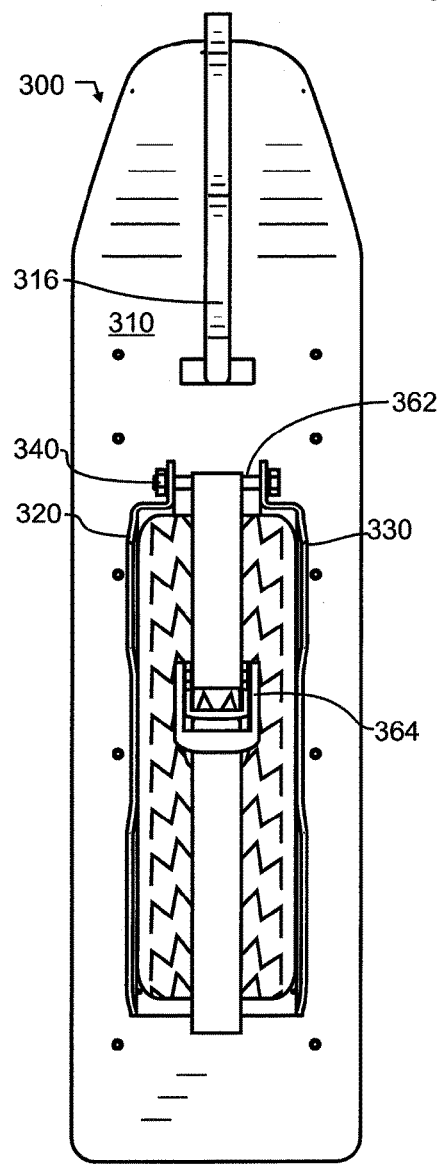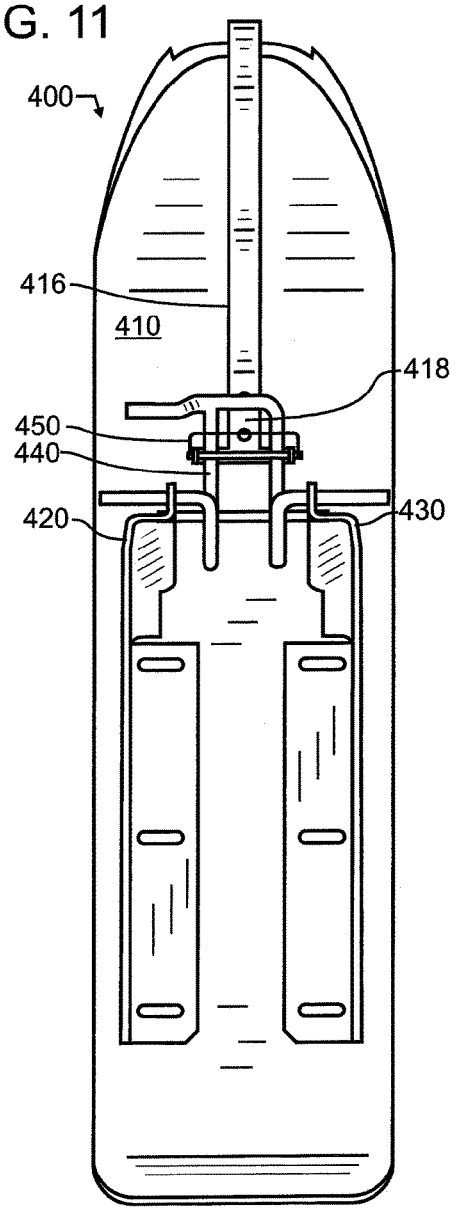

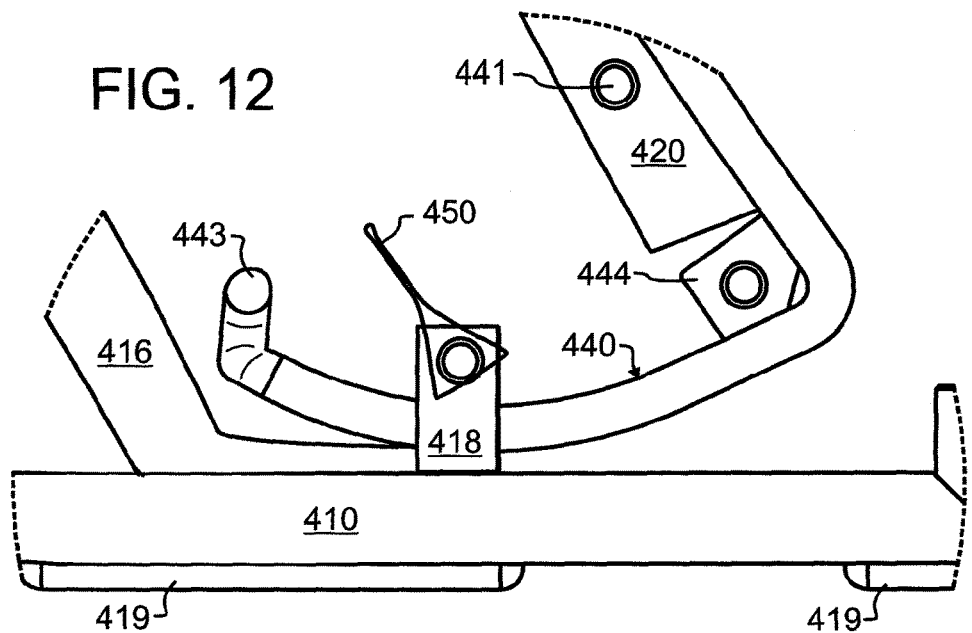
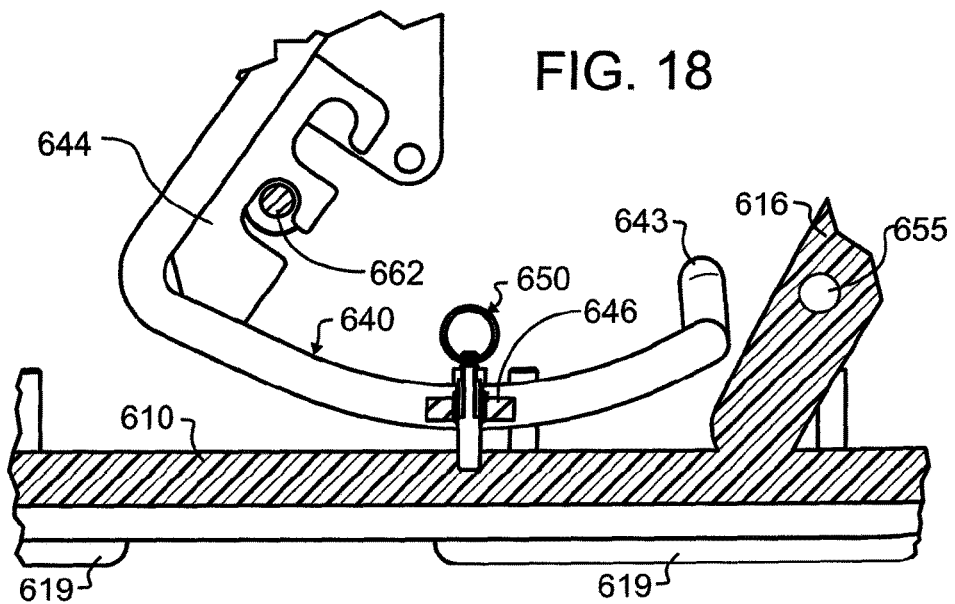

QUICK-RELEASE ATV SKIS

CROSS REFERENCE TO RELATED APPLICATIONS

This application is a continuation of co-pending U.S. patent application Ser. No. 14/861,926 filed Sep. 22, 2015 and granted as U.S. Pat. No. 9,457,831 on Oct. 4, 2016, which in turn is a divisional of U.S. patent application Ser. No. 13/960,759 filed Aug. 6, 2013 and granted as U.S. Pat. No. 9,139,216 on Sep. 22, 2015, which in turn claims the benefit under 35 U.S.C. 119(e) of U.S. provisional patent application 61/680,269 filed Aug. 6, 2012, and is a continuation-in-part of U.S. patent application Ser. No. 13/855,884 filed Apr. 3, 2013 and granted as U.S. Pat. No. 8,739,913 on Jun. 3, 2014, which in turn is a continuation of U.S. patent application Ser. No. 13/027,231 filed Feb. 14, 2011 and granted as U.S. Pat. No. 8,418,792 on Apr. 16, 2013, which in turn claims the benefit under 35 U.S.C. 119(e) of U.S. provisional patent application 61/326,217 filed Apr. 20, 2010 and naming the present first-named inventor, the contents of each which are incorporated herein by reference in entirety.

BACKGROUND OF THE INVENTION

1. Field of the Invention

This invention pertains generally to the field of motor vehicles, and more particularly to the provision of one or more ski-like or runner members substitutable for wheel type support structure. Closely related thereto in an alternative manifestation, this invention pertains generally to land vehicles, and more particularly to vehicles with runners applied to the wheels of wheeled vehicles.

2. Description of the Related Art

In many parts of the country, transportation is taken for granted. Through a vast network of paved and well-maintained roads and readily available and affordable automobiles and motorcycles, the vast majority of people are able to travel where they need to. In most cases, they may also take time to travel for recreational purposes. In addition to automobiles and motorcycles, which perform admirably on wet or dry roadways, other types of motor vehicles have proved to be useful and beneficial and so are being used by more people.

One such vehicle is an All-Terrain Vehicle (ATV), which is designed to traverse diverse areas, including both roadways and also unpaved areas where automobiles and motorcycles are unable. An ATV may have three or more wheels, and will often have four. The tires are often relatively wide and of large diameter, and the ATV will often have a relatively soft suspension having a long travel. The combination of large diameter tire and long, soft suspension permits the ATV to travel over rough terrain, and also helps the ATV to stay on the surface of ground that would otherwise be impassable by many other motor vehicles, such as mud and loose sand. Most ATVs are also relatively smaller and lighter than an automobile, and may typically be designed to transport one or two persons.

ATVs have filled a void in motor transportation, by permitting people to travel in areas that previously were passable only on foot or with the assistance of animals such as horses or the like. Their utility for agriculture, emergency, light duty towing and plowing, and many other work activities has created a significant demand. Further, they have enabled people to travel when road conditions might otherwise have previously prevented them. This can be crucial during an emergency, when motorized transportation may be critical to the preservation of life. Finally, ATVs have also proven to be quite enjoyable for most people to operate recreationally, further expanding the applications and prevalence of these machines.

In spite of the many benefits derived from an ATV, they do have limitations. One of these is in the northern climates, where snow can get quite deep and last for long periods of time. While an ATV can pass through relatively shallower snow depths, as the snow deepens, the ATV will sink into the snow, and passage through the snow becomes sufficiently difficult that the ATV motor and transmission may be damaged.

Recognizing these limitations, artisans have provided track drives that replace the ATV wheels, and which have much larger surface area than the tires. These track drives resemble those found on snowmobiles, and the intent is to enable the ATV to perform in an environment where previously only a snowmobile would have been able to travel. Instead of the single track found on most typical snowmobiles, a four-wheel ATV will generally be fitted with four tracks, such that each wheel is replaced with a track. The tracks permit the ATV to be driven through more extreme ground than would have been possible with tires, such as through extremely slippery mud or very deep snow. However, this also requires that the ATV be an all-wheel drive model. Noteworthy here is that many ATVs are not all-wheel drive. Furthermore, tracks require more power to drive and operate, regardless of the surface, than tires that are operated on relatively smooth and level ground. Consequently, even in the case of an all-wheel drive ATV, the tracks require enough more power that an operator may accidentally overwork the engine and transmission.

Others in the field of wheeled motor vehicles have contemplated ways to enable the motor vehicles to be operated on more diverse surfaces or through challenging weather. Exemplary patents that replace wheels with hub-attached skis, and in many cases, drive tracks, the contents and teaching which are incorporated herein by reference, include U.S. Pat. No. 1,545,264 by Logan, entitled "Motor sled"; U.S. Pat. No. 1,225,444 by Leclair, entitled "Runner attachment for vehicles"; U.S. Pat. No. 1,433,122 by Coffey et al, entitled "Motor vehicle"; U.S. Pat. No. 1,437,408 by Estes, entitled "Automobile sled"; U.S. Pat. No. 1,449,036 by Feden, entitled "Automobile sleigh attachment"; U.S. Pat. No. 1,511,331 by Harris, entitled "Motor sleigh"; U.S. Pat. No. 1,522,816 by Ghent et al, entitled "Runner attachment for automobiles"; U.S. Pat. No. 1,575,174 by Mierzejewski, entitled "Motor sleigh"; U.S. Pat. No. 1,576,395 by Wood et al, entitled "Attachment for automobiles"; U.S. Pat. No. 1,611,193 by Hegerland, entitled "Sleigh attachment for motor vehicles"; U.S. Pat. No. 1,642,714 by Barrett, entitled "Auto wheel sleigh runner"; U.S. Pat. No. 1,701,212 by Nickerson, entitled "Sleigh attachment for motor vehicles"; U.S. Pat. No. 1,825,133 by Spacsek, entitled "Sled attachment for automobiles"; U.S. Pat. No. 1,907,236 by Bellerive, entitled "Drive attachment for vehicles"; U.S. Pat. No. 3,480,289 by Larkin, entitled "Surface vehicle"; U.S. Pat. No. 3,521,897 by Fester et al, entitled "Mechanism for detachably attaching a runner to a vehicle wheel"; U.S. Pat. No. 3,545,559 by Jones et al, entitled "Endless track attachment for motorcycles"; U.S. Pat. No. 3,592,279 by Donelson, entitled "Snow scooter"; U.S. Pat. No. 3,596,727 by Graham, entitled "Runner attachment for motorcycle"; U.S. Pat. No. 3,630,301 by Henricks, entitled "Convertible snow motorcycle"; U.S. Pat. No. 3,650,342 by Pushnig et al, entitled "Convertible snow track-wheeled scooter type vehicle"; U.S. Pat. No. 3,845,967 by O'Brien et al, entitled "Ski construction for vehicles"; U.S. Pat. No. 3,872,938 by DeGroot, entitled "Convertible ground and snow traveling vehicle"; U.S. Pat. No. 3,901,525 by O'Brien et al, entitled "Ski construction for vehicles"; U.S. Pat. No. 4,699,229 by Hirose et al, entitled "Endless articulated steel band vehicle for off-road services"; U.S. Pat. No. 4,869,336 by Nakasaki et al, entitled "Snowmobile"; U.S. Pat. No. 5,911,422 by Carpenter et al, entitled "Recreational wheeled accessory carrier"; U.S. Pat. No. 6,095,275 by Shaw, entitled "Conversion system for all terrain vehicles"; U.S. Pat. No. 3,233,455 by Haltmayer, entitled "Snow equipment for a motor vehicle"; EP 0391282 by Yoshioka et al, entitled "Snow vehicle"; FR2599699 by Bruzzone, entitled "Device and corresponding accessories for converting a moped into a vehicle suitable for operating on snowy ground"; and WO 99/43540 by Forbes, entitled "Snow vehicle".

These conversion apparatus have the benefit of providing very secure and solid coupling into the vehicle carriage structure, meaning that, when properly installed, they are very reliable. They also have the unfortunate limitation of disabling, and in most cases, completely removing the drive wheels. This leaves the vehicle disabled except when there is sufficient snow, mud or other slippery surface for the runners to slide. Furthermore, an operator must spend a substantial amount of time removing each tire and replacing it, time that further includes undesirable risks associated therewith. These risks include potential damage to the tires, hubs, or the person doing the work. As a result, only the most critical of applications will lead an owner or operator to carry out the work of switching away from tires, and, then once switched, the owner or operator will be quite reluctant to switch back. This effectively leads the owner to desire two vehicles, one which has runners and/or tracks for snow, and one which is wheeled for best performance on paved areas. This is exactly the situation that the replacement of wheels was intended to address, meaning few operators will continue to switch back and forth between tracks and wheels, unless extreme circumstances demand them to do so.

Another group of artisans have attempted to avoid the need for removing the vehicle tires. Patents illustrating wheel-coupling skis or runners, the teachings and contents which are incorporated herein by reference, include: U.S. Pat. No. 861,037 by Kubelka, entitled "Sleigh attachment for vehicles"; U.S. Pat. No. 1,218,128 by Swanson, entitled "Sled runner attachment for vehicle wheels"; U.S. Pat. No. 1,336,448 by Tollbom, entitled "Autosled"; U.S. Pat. No. 1,337,153 by Peterson, entitled "Runner attachment for automobiles"; U.S. Pat. No. 1,345,321 by Enberg, entitled "Runner for side cars"; U.S. Pat. No. 1,350,069 by Corsepius, entitled "Sled-runner attachment for automobiles"; U.S. Pat. No. 1,363,148 by Morse, entitled "Sleigh attachment for autos"; U.S. Pat. No. 1,392,438 by Nelson, entitled "Sleigh attachment for autos"; U.S. Pat. No. 1,406,207 by Miller, entitled "Sleigh runner for motor vehicles"; U.S. Pat. No. 1,425,835 by Bufe, entitled "Autosleigh attachment"; U.S. Pat. No. 1,438,326 by Nelson, entitled "Vehicle runner"; U.S. Pat. No. 1,449,738 by Ducatt, entitled "Runner attachment for wheels"; U.S. Pat. No. 1,460,605 by Rantasa, entitled "Automobile sleigh attachment"; U.S. Pat. No. 1,629,061 by Armstrong, entitled "Sled attachment for automobiles"; U.S. Pat. No. 1,631,873 by Knight, entitled "Wheel runner"; U.S. Pat. No. 1,733,774 by Brye, entitled "Snow runner for vehicles"; U.S. Pat. No. 1,774,835 by Lombard, entitled "Traction device"; U.S. Pat. No. 1,810, 042 by Gerth, entitled "Snow runner"; U.S. Pat. No. 2,237, 471 by Billings, entitled "Landing ski for airplanes"; U.S. Pat. No. 2,284,075 by Tucker et al, entitled "Snow tractor"; U.S. Pat. No. 2,589,602 by Clark, entitled "Ski attachment for wheeled vehicles"; U.S. Pat. No. 2,818,265 by Calderwood, entitled "Runner attachment for wheels"; U.S. Pat. No. 2,853,307 by Dombrowski, entitled "Sleigh runners for automobiles and airplanes"; U.S. Pat. No. 2,932,525 by Perry, entitled "Sled runner for tractors"; U.S. Pat. No. 3,070,383 by Roe, entitled "Snow runners for vehicle wheels"; U.S. Pat. No. 3,087,266 by McEvoy, entitled "Snow shoe for automobile wheel"; U.S. Pat. No. 3,252,533 by Aeder et al, entitled "Snow scooter"; U.S. Pat. No. 3,336,994 by Pederson, entitled "Endless crawler attachment for cycles"; U.S. Pat. No. 3,367,674 by Puhl, entitled "Wheelbarrow attachment"; U.S. Pat. No. 3,370,665 by Stanaback, entitled "Tandem axle vehicle"; U.S. Pat. No. 3,412,820 by Wachholz, entitled "Endless track attachment for motorcycles"; U.S. Pat. No. 3,412,821 by Humphrey, entitled "Track for motorcycle"; U.S. Pat. No. 3,473,818 by Meredith, entitled "Ski attachments for wheels"; U.S. Pat. No. 3,651,879 by Wilson, entitled "Convertible vehicle"; U.S. Pat. No. 3,737,001 by Rasenberger, entitled "Track assembly for converting wheeled vehicles"; U.S. Pat. No. 4,534,437 by Howerton et al, entitled "Snow track belt for motorcycle"; U.S. Pat. No. 4,577,876 by Harris, entitled "Ski attachment for vehicle wheels"; and U.S. Pat. No. 5,413,361 by Mosher, entitled "Ski-rail for a wagon".

This technology allows the operator to leave wheels attached to hubs, but is not without other limitations. There are several limitations that carry throughout most of the prior art. One limitation is the undesirable need to lift or jack the vehicle wheels up in order to install the skis. As might be appreciated, jacking or otherwise lifting a vehicle always presents undesirable risk, requires significant time, and limits when and where the runners may be attached. Another prior art limitation is the need to secure directly to a portion of the wheel inside of the outer circumference. Such requirement limits those inventions to particular wheel types, and potentially even particular wheel diameters. Further, such securement tends to be localized, such as in the Kubelka patent, meaning that the front tire is secured with two fasteners passing inside of the tire rim. Should there be large forces applied to the ski or runner, the forces will not be evenly distributed throughout the tire, and instead will be concentrated at the two anchor points. This can lead to unintended damage or deformation of the rim. Yet another prevalent limitation is the need for tools to execute the attachment and removal of the runners.

Two exemplary patents illustrate runners that a wheeled vehicle may be driven onto, the teachings and contents which are incorporated herein by reference: U.S. Pat. No. 2,437,622 by Stryker, entitled "Skid runner attachment for vehicles"; and U.S. Pat. No. 3,321,211 by Bryant et al, entitled "Runner attachment". These constructs greatly facilitate the installation of the runner, and do not require special tools. Unfortunately, and depending upon the vehicle, travel speed, and surface being traversed, very large twisting forces or torque may be applied between the runner and tire. The lack of additional structure enables undesirable movement between runner and tire, and can lead to dangerous separation therebetween.

Two additional exemplary patents illustrate improvement by providing side walls that can capture the wheels, providing further support and reducing the likelihood of catastrophic disconnect. The patents, the contents and teachings which are incorporated herein by reference, include: U.S. Pat. No. 2,321,561 by Bircher, entitled "Ski mechanism for aircraft"; and U.S. Pat. No. 2,883,204 by Tomasovich, entitled "Tractor ski". The Bircher patent requires a known width of tire in order to capture the tire in the cage properly, and so must be sized to co-operate with a single width of tire. While Tomasovich can accommodate tires of different widths, this is only because the side walls are captured between immediately adjacent front wheels found essentially only on tractors.

Three additional patents that illustrate concepts relevant to the present invention, the contents and teachings which are incorporated herein by reference, include: U.S. Pat. No. 3,774,926 by Chase, entitled "Ski device for wheeled vehicles"; EP 0270237 by Cartwright et al, entitled "Improvements in crawler-track attachments for all-terrain vehicles"; and U.S. Pat. No. 2,741,486 by Torgrimson, entitled "Sled runner attachment for wheeled vehicles". The Chase patent illustrates a runner that is secured about the outer circumference of a wheel using an over-center clamp, and which captures the wheel in a pocket. However, the pocket has low wall height, in all likelihood to facilitate drive-on capability, but this low wall height also mans that there is almost no effective wall support, meaning that this design is prone to limitations similar to Stryker and Bryant et al above, where the lack of sufficient additional wall structure enables undesirable twisting movement between runner and tire, and can lead to dangerous separation therebetween. In other words, if the walls of Chase are elevated, then the vehicle will need to be lifted in, but if the walls are lower to permit drive-in coupling, then there will not be sufficient support to prevent relative twisting between tire and runner. Torgrimson has elevated side supports, but, like other patents discussed herein above, the Torgrimson concept has a single securement directly to a portion of the wheel inside of the outer circumference. This limits that concept to a particular wheel type and diameter, and, since the securement tends to be localized to the single fastener passing inside of the tire rim, in the event large forces are applied to the ski or runner, the forces will not be evenly distributed throughout the tire, and instead will be concentrated at the single anchor point. This can lead to unintended damage or deformation of the rim. The Cartwright patent overcomes many of the aforementioned limitations, but does not clearly permit drive-on installation, and definitely requires the use of tools to enable the apparatus to be attached to a tire.

Other patents, the contents and teachings which are incorporated herein by reference, include: U.S. Pat. No. 1,566,085 by Geaudreau, entitled "Runner attachment for automobiles"; U.S. Pat. No. 1,844,295 by Perry, entitled "Landing gear for aircraft"; U.S. Pat. No. 3,140,752 by Feu, entitled "Motorized snow vehicle"; and U.S. Pat. No. 4,618,015 by Yochum, entitled "Rear swing arm assembly for three or four wheeled off-the-road vehicle track conversion unit".

In addition to the aforementioned patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is a quick-release ATV ski. A ski-shaped wheel support holds a pair of wheel receivers longitudinally along the support and spaced laterally from each other to define a wheel cage. A strap anchor is adjacent a first end of the wheel cage. An over-center clamp is adjacent a second end of the wheel cage distal to the first end. A strap is coupled between strap anchor and over-center clamp. A removable lock positively engages the over-center clamp and thereby prevents accidental release of the over-center clamp.

In a second manifestation, the invention is, in combination, a ski-shaped wheel support, at least one support arm extending normal to the ski-shaped wheel support, and a pivotal wheel cage. The pivotal wheel cage is pivotally supported upon the support arm and is pivotal from a first position having a first edge adjacent to the ski-shaped wheel support and a second edge distal to the first edge spaced from the ski-shaped wheel support, to a second position having first and second edges of said pivotal wheel cage approximately equidistant from the ski-shaped wheel support.

In a third manifestation, the invention is, in combination, an ATV endless track uncoupled from a rotary drive, a conformal ski, and a tensioning member retaining the conformal ski between the ATV track and a ground surface.

OBJECTS OF THE INVENTION

Exemplary embodiments of the present invention solve inadequacies of the prior art by providing a drive-on runner and coupling having in one embodiment width-adjustable side walls, an over-center clamp, and a lock for securing the over-center clamp. In a second embodiment, a pivotal tire cage is pivoted from a drive-on position to a position capturing the tire, simply by forward travel of the tire. In a third embodiment, a track is converted to a runner by the application and tensioning of a flexible plastic ski.

A first object of the invention is to enable a wheeled or track motor vehicle to be converted to a runner vehicle for operation in more extreme conditions than would be achieved with the wheels and at less load upon the motor and transmission than would be achieved with tracks. A second object of the invention is for this conversion be intuitive, require minimal time and effort, and most preferably, not require tools or jacking of the vehicle. An additional object of the invention is to be compatible with tires of diverse width and diameter. Another object of the present invention is to ensure that, when properly installed and used, the runners will operate in a safe manner and will not harm the vehicle or operator. A further object of the invention is to enable an ATV front wheel set to be fit with runners, to reduce the load on the motor and transmission in heavy snow or deep mud. Yet another object of the present invention is to allow an ATV to be fit with rear tracks and front skis, or to be fit with four tracks and to convert the front two tracks into runners.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIG. 10 illustrates a third alternative embodiment quick-release All-Terrain Vehicle (ATV) ski designed in accord with the teachings of the present invention from projected view.

FIGS. 11 and 12 illustrate a fourth alternative embodiment quick-release All-Terrain Vehicle (ATV) ski designed in accord with the teachings of the present invention from top plan and side elevational views, respectively.

FIGS. 17 and 18 illustrate a sixth alternative embodiment quick-release All-Terrain Vehicle (ATV) ski designed in accord with the teachings of the present invention from projected and enlarged side sectional views, respectively.

DESCRIPTION OF THE PREFERRED EMBODIMENT

Figure 1:
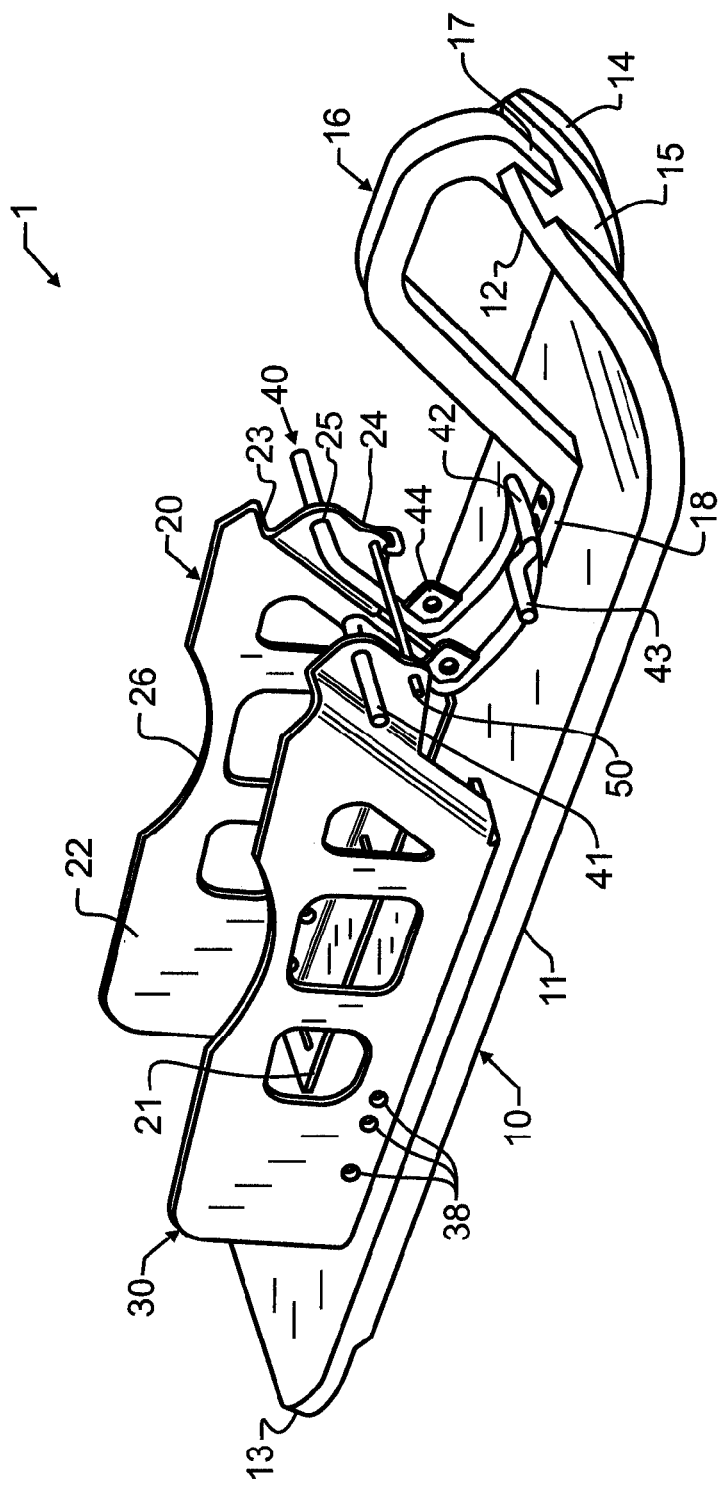
FIG. 1 illustrates a preferred embodiment quick-release All-Terrain Vehicle (ATV) ski designed in accord with the teachings of the present invention from projected view.

In a preferred embodiment of the invention illustrated in FIG. 1, a quick-release ATV ski 1 incorporates a ski-shaped wheel support 10 having a generally planar ski base 11, a raised leading tip 12, and a slightly raised trailing edge 13. Leading edge 12 is raised to float over the top of snow during forward travel, tending to drive the snow down under base 11. Since a driver may occasionally desire to back up, trailing edge 13 will also preferably have a slight raise above base 11, but ordinarily the reverse movement of ski 1 will be both slower and of shorter duration than forward movement, and so a much smaller elevation will be suitable for trailing edge 13 relative to leading edge 12. A lower surface of ski 1 does not have to be level, and as illustrated, inner bottom ski surface 15 is slightly elevated relative to outer bottom ski surfaces 14. Furthermore, there may optionally be one or more wear bars affixed to the bottom of ski 1, as is known in the snowmobile art.

As aforementioned, during forward travel, leading edge 12 of ski 1 may encounter significant forces that might tend to deform or break edge 12. To reduce the likelihood of such an event, a strengthening member 16 is preferably provided that couples through bifurcated end 17 to the very tip of leading edge 12, while bolting at distal end 18 to wheel support 10. While the bifurcated end is felt to be optimal, the specific geometry and construction of strengthening member 16 is not critical to the operation of ski 1, and may take other forms or geometries.

A drive-in wheel cage is formed by two wheel receivers 20, 30, which, in the preferred embodiment but not limited thereto, mirror each other. As a result, discussion of the features of wheel receiver 20 will be understood to apply to wheel receiver 30 as well. The features pertaining to wheel receiver will start with a two in the tens digit, and so will range between 20 and 29, while like features in wheel receiver 30 will have the same ones digit, but will have a three in the tens digit position, whether explicitly labeled in the drawings or not. Where the ones digits correspond between wheel receiver 20 and wheel receiver 30, the features will be understood to be functionally alike and structurally alike, other than the differences induced by the two wheel receivers being mirror images of each other.

Figure 2:
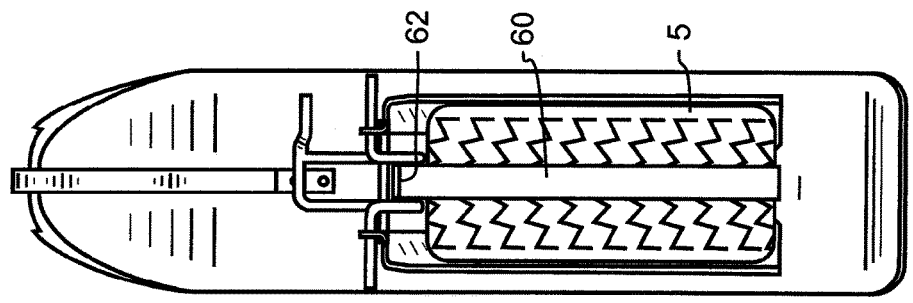
FIGS. 2-4 illustrate the preferred embodiment quick-release All-Terrain Vehicle (ATV) ski of FIG. 1 in sequential stages of coupling with a tire, from top view.

Wheel receiver 20 has a base 21 extending roughly perpendicular thereto, making base 21 generally parallel to and immediately adjacent to base 11. Side wall 22 rises therefrom for side engagement with a wheel 5 (illustrated in FIGS. 3 and 4). As wheel 5 rolls forward, it will eventually reach wheel stop 23, which is a steeply sloped, but not quite vertical wall. Folding forward from there is forward lip 24 having a pivot hole 25 therein. The opposed ends or terminations 41 of tire clamp 40 pass through pivot holes 25 and 35, which allows tire clamp 40 to pivot about an axis defined between wheel receivers 20, 30 that is generally parallel with base 11 but extending transverse thereto. Wheel receiver 20 may additionally have a slight depression 26 along the side wall that can accommodate low and wide wheel bearing caps or hubs. As illustrated in FIG. 2, wheel receiver 20 will also preferably be provided with one or more slots 27 therein, which permits wheel receiver 20 to be spaced at a greater or lesser distance from wheel receiver 30, and thereby accommodate wheels of different widths.

Tire clamp 40, which may for exemplary purposes be formed from large diameter wire, wraps in a bent, U-shape to top 42 distal to terminations 41. Top 42 may be provided with optional handle 43 extending therefrom. Midway between top 42 and terminations 41, tire clamp 40 forms a perpendicular bend, at which a pin receiver 44 is located. When in the position illustrated in FIG. 1, a locking pin 50 may pass from wheel receiver 20 to wheel receiver 30. Locking pin 50 will prevent tire clamp 40 from pivoting, even in the most extreme circumstances.

Figure 3:
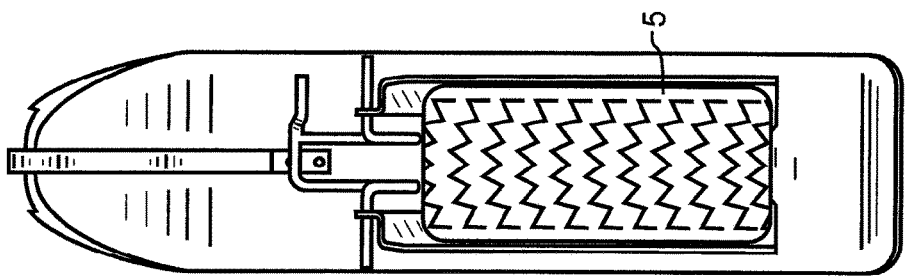

FIG. 2 illustrates the preferred embodiment quick-release ATV ski from a top view, prior to tire 5 being driven into engagement. FIG. 3 shows an intermediate coupling step, where locking pin 50 has been removed, and tire 5 has been driven onto base 11, base 21 and base 31, and is engaged with wheel stops 23, 33.

From the position illustrated in FIG. 3, a pin, bolt, rod or other fastener, coupled with a termination of strap 60 which may for exemplary purposes be a loop termination, will be passed through a hole 38 and the corresponding aligned hole 28. This strap loop about a pin forms an anchor for a first end of strap 60. The plurality of holes 28, 38 are provided to accommodate tires of different diameters, thereby allowing all tires to stop at forward travel against wheel stops 23, 33.

Figure 4:
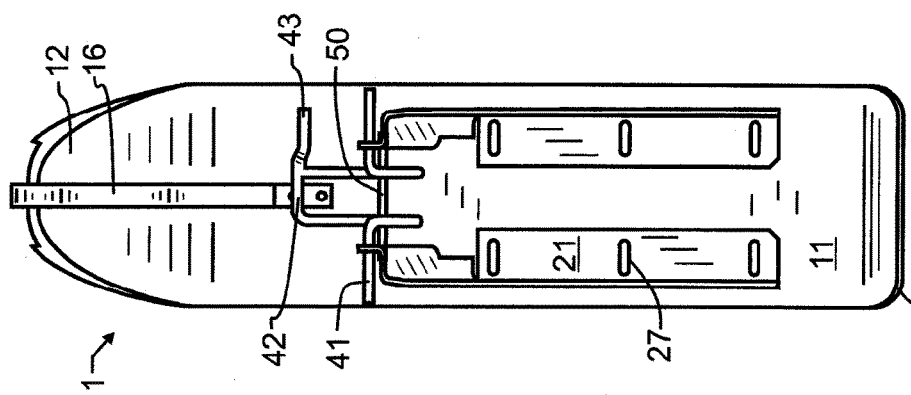

Strap 60 will then be passed over the top of tire 5, as illustrated in FIG. 4, and pin or similar fastener 62 having the second termination of strap 60 coupled therewith will be passed through holes 44 with handle 43 raised. Raising handle 43 will be understood to be rotating handle 43 counter-clockwise in the view of FIG. 1. Handle 43 may be rotated fully counter-clockwise to where top 42 physically contacts tire 5. As will be appreciated, at this position, strap 60 will be in the most relaxed or loose position. As handle 43 is rotated clockwise, and thereby lowered down towards base 11, holes 44 carrying pin 62 will extend farthest down when holes 44 are approximately immediately below holes 25, 35. In this position, strap 60 is in the greatest tension. Finishing the rotation of handle 43 to the position shown in FIG. 1 actually releases some of the tension on strap 60. This means that, to come loose, handle 43 must be rotated counterclockwise first through increasing tension, which means increasing resistance to further rotation. Once holes 44 pass from immediately below holes 25, 35, then further rotation begins to release tension, making it much easier to continue to rotate handle 43 and release all tension in strap 60. This is known in the mechanical arts as an over-center linkage or lock.

The over-center clamp provides significant protection against accidental disconnect. However, by inserting pin 50 as shown in FIGS. 1 and 4, handle 43 is no longer free to rotate, thereby positively securing handle 43, tire 5 and base 11 together.

The fabrication of the preferred over-center tire clamp 40 from wire, and the large open areas with only the two passages through pivot holes 25, 35, is important in the preferred embodiment. The preferred embodiment quick-release ATV ski 1 is designed for operation in a cold and snowy environment. In that environment, parts are commonly coated with snow and ice, and, if not properly designed, may freeze and become inoperable. The preferred tire clamp 40 is very resistant to ice and snow.

The preferred embodiment ATV ski 1 will preferably couple to a single front tire 5 of an ATV. In the case of a four wheel ATV, a like ski will be coupled to the second front tire. Thus, the preferred ski will permit the front wheel(s) of an ATV to slide over snow, mud, and similar terrain less well-suited to ordinary ATV wheels. The rear ATV wheels may be left unaltered, or more commonly, tracks would be substituted for the rear wheels.

This conversion from four ordinary tires to ski(s) and tracks enables the ATV to be used through all four seasons far more efficiently than the use of only tracks or only tires. In the prior art, where four tracks are used there is a substantial load placed upon the engine and transmission that can be too great for a stock drive train. In contrast, the present invention permits two-wheel drive ATVs to operate over similar terrain, and permits four-wheel drive vehicles to be operated in only two-wheel, or two-track, drive so as to not excessively load the drive train.

The rapid conversion enabled in the preferred embodiment offers another important advantage over the prior art. It is common to need to traverse both a cleared roadway and snow, mud or the like. The present invention, which combines drive-on installation with simple clamp motion to install the preferred embodiment quick-release ATV ski, requires only a few seconds. Furthermore, since no jacking is required and instead the ATV is simply driven onto the skis, the skis may be installed in nearly any location by nearly any operator. This allows a person to ride the ATV along a cleared roadway using the standard ATV pneumatic tires engaging the roadway. Then the person may pull off the road and install the skis upon entering a snow-covered area. When leaving the snow covered area, the skis are again readily removed, and may be stored on an ATV rack or the like while not in use.

Figure 5:
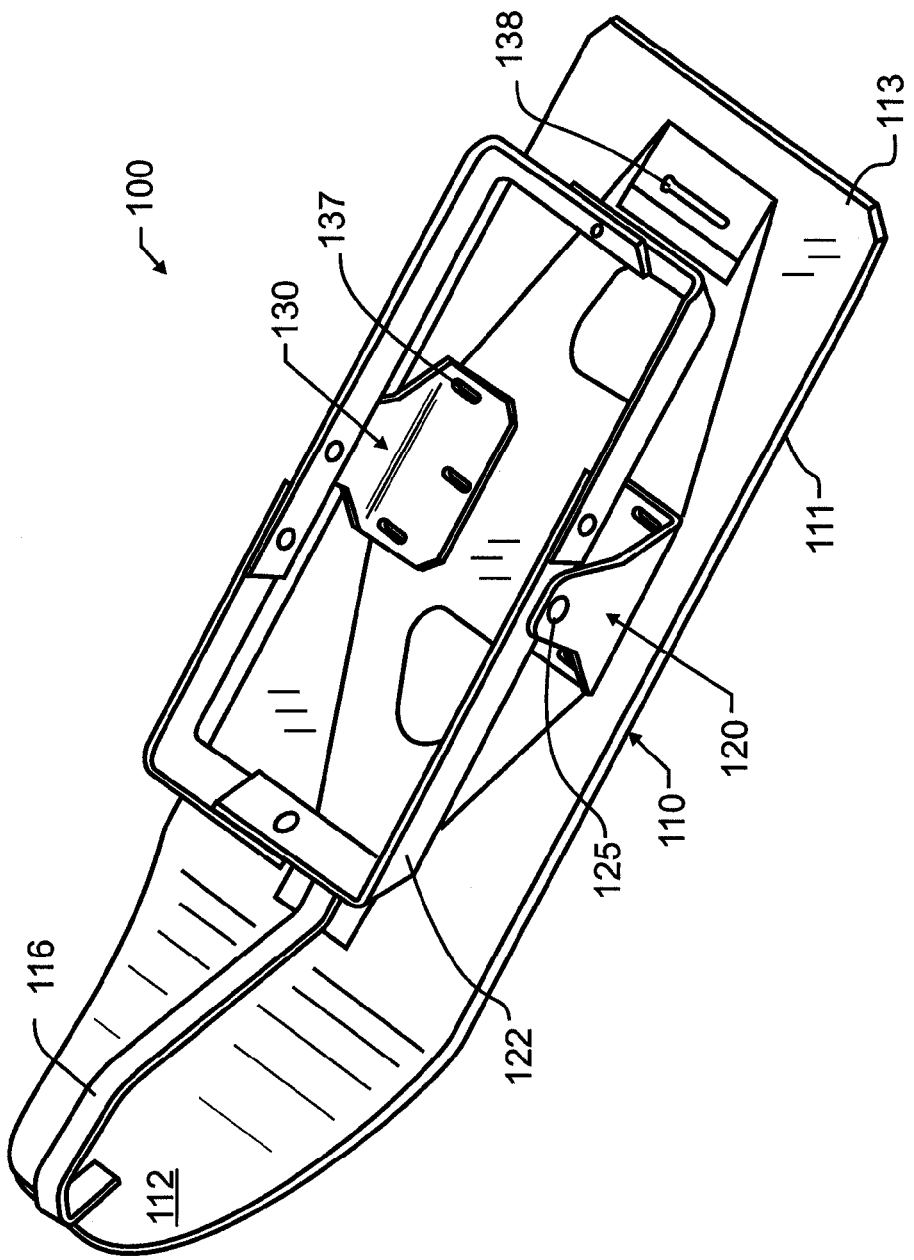
FIG. 5 illustrates an alternative embodiment quick-release All-Terrain Vehicle (ATV) ski designed in accord with the teachings of the present invention from projected view.
Figure 6:
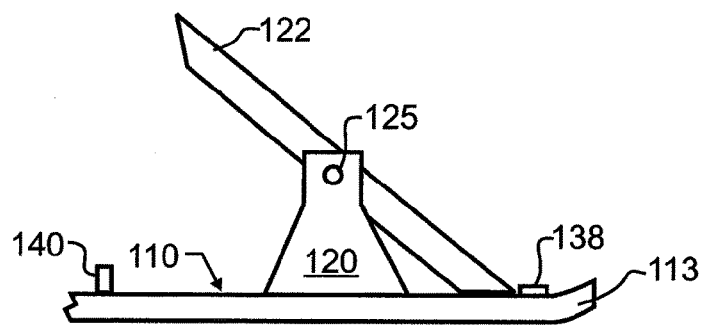
FIGS. 6-8 illustrate the alternative embodiment quick-release All-Terrain Vehicle (ATV) ski of FIG. 5 in sequential stages of coupling with a tire, by simplified and sectioned side view.
Figure 7:
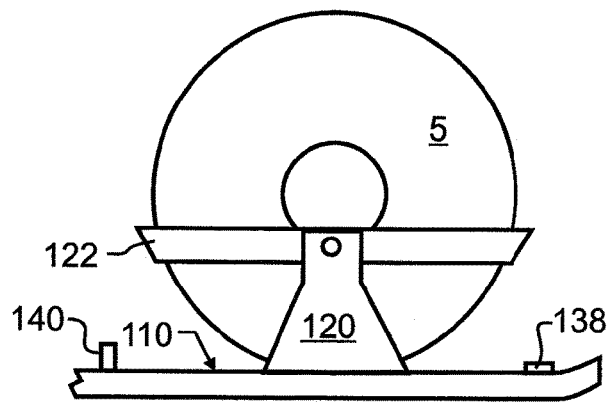
Figure 8:
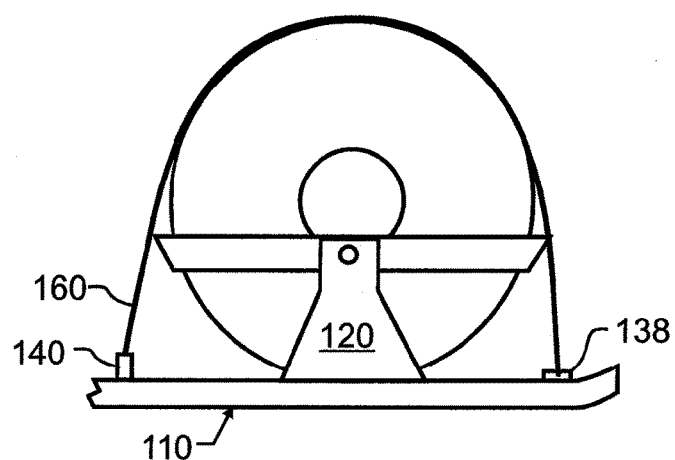

FIG. 5 illustrates an alternative embodiment quick-release All-Terrain Vehicle (ATV) ski designed in accord with the teachings of the present invention from projected view, while FIGS. 6-8 illustrate the alternative embodiment quick-release All-Terrain Vehicle (ATV) ski in sequential stages of coupling with a tire.

Various embodiments of apparatus designed in accord with the present invention have been illustrated in the various figures. The embodiments are distinguished by the hundreds digit, and various components within each embodiment designated by the ones and tens digits. However, many of the components are alike or similar between embodiments, so numbering of the ones and tens digits have been maintained wherever possible, such that identical, like or similar functions may more readily be identified between the embodiments. If not otherwise expressed, those skilled in the art will readily recognize the similarities and understand that in many cases like numbered ones and tens digit components may be substituted from one embodiment to another in accord with the present teachings, except where such substitution would otherwise destroy operation of the embodiment. Consequently, those skilled in the art will readily determine the function and operation of many of the components illustrated herein without unnecessary additional description.

As shown in FIG. 5, a pair of support arms 120, 130 and pivots 125 couple a wheel cage 122 onto ski-shaped wheel support 110. Wheel support 110 has a base 111, up-curved leading edge 112, and slightly up-curved trailing edge 113, all functionally similar to those of FIGS. 1-4. A brace 116 performs like support as brace 16, and adjustments 137 allow support arms 120, 130 to be moved closer or farther from each other, as needed or required for a particular ATV wheel.

The ski-shaped wheel support as illustrated has a leading edge 112 in the forward direction which is additionally slightly elevated relative to the generally planar area under the wheel cage 122, which helps the ski stay on top of the snow when traveling forward. However, the specific geometry of ski-shaped wheel support 110 is not critical to the present invention. Instead, a variety of geometries are contemplated herein, particularly a wheel support having both forward 112 and rearward 113 up-curved edges, facilitating both forward and reverse travel. The single point as illustrated enables simple coupling, since the skis may be placed in front of ATV tires 5, and then the ATV may simply be driven forward onto the skis. As long as the trailing edge 113 is relatively minimally elevated, the ATV may still be driven directly onto ski 100, but at some dimension, a rearward point that is too elevated will interfere with driving onto the ski.

The ski-shaped wheel support 110 may be fabricated from a variety of materials, including durable metals such as steel or durable plastics such as high density or Ultra-High Molecular Weight (UHMW) polyethylene, or laminates, composites or other suitable materials and compositions. The bottom surface of the ski-shaped wheel support may optionally incorporate a longitudinal skid or wear bar in a fashion similar to the wear bars found commonly on snowmobiles to protect the ski bottom against undesirable wear. These wear bars can also help reduce slippage during cornering.

The ski coupling in this alternative embodiment includes a pivotal wheel cage. This pivotal cage in a first position as illustrated by simplified side view in FIG. 6 allows ATV tire 5 to be driven onto ski-shaped wheel support 110. Once tire 5 passes over the rear portion of wheel cage 122, adjacent to trailing edge 113, cage 122 will then pivot forward with forward movement of tire 5, and thereafter constrains the tire against further movement forward or to the side. A strap 160 is then used to wrap about the upper circumference of tire 5 to bind the tire to ski-shaped wheel support 110. The cage 122 remains in place, which helps to ensure the ski stays in place.

As is visible in the figures, the preferred embodiment cage has parallel side members, but the front and back walls of the wheel cage are not parallel to each other. Instead, the rear cage is sloped such that it lays relatively flat when in the loading and unloading position as illustrated in FIG. 6. This angular offset further facilitates coupling by driving onto the ski 100, while not adversely altering the steps required for removal of ski 100. The cage 122 is preferably sufficiently durable to assist with the capture and holding of tire 5, even through turns, bumps and other events that might otherwise separate ski 110 from tire 5.

The strap 60, 160 may take a variety of suitable geometries, configurations, and even materials, but will preferably be readily displaced such that an ATV tire may be driven into the wheel cage. In the preferred embodiment, the strap is flaccid, and may be fabricated from nylon or other fabrics or materials, chain, rope, cable, or any other suitable material. Other suitable means for holding the ski and tire together are contemplated herein and may include various plates, clamps or the like.

Figure 9:
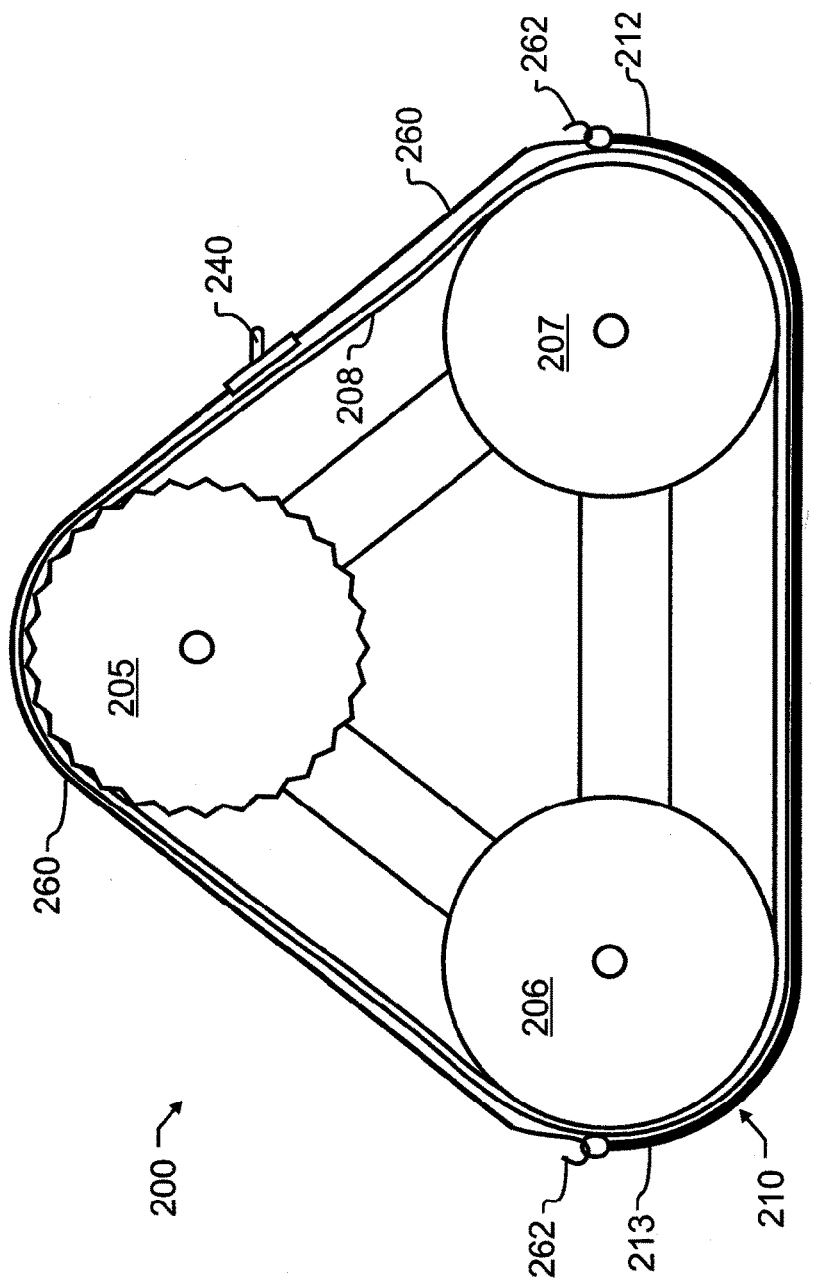
FIG. 9 illustrates a second alternative embodiment quick release ATV ski in combination with an ATV track from side view.
Figure 13:
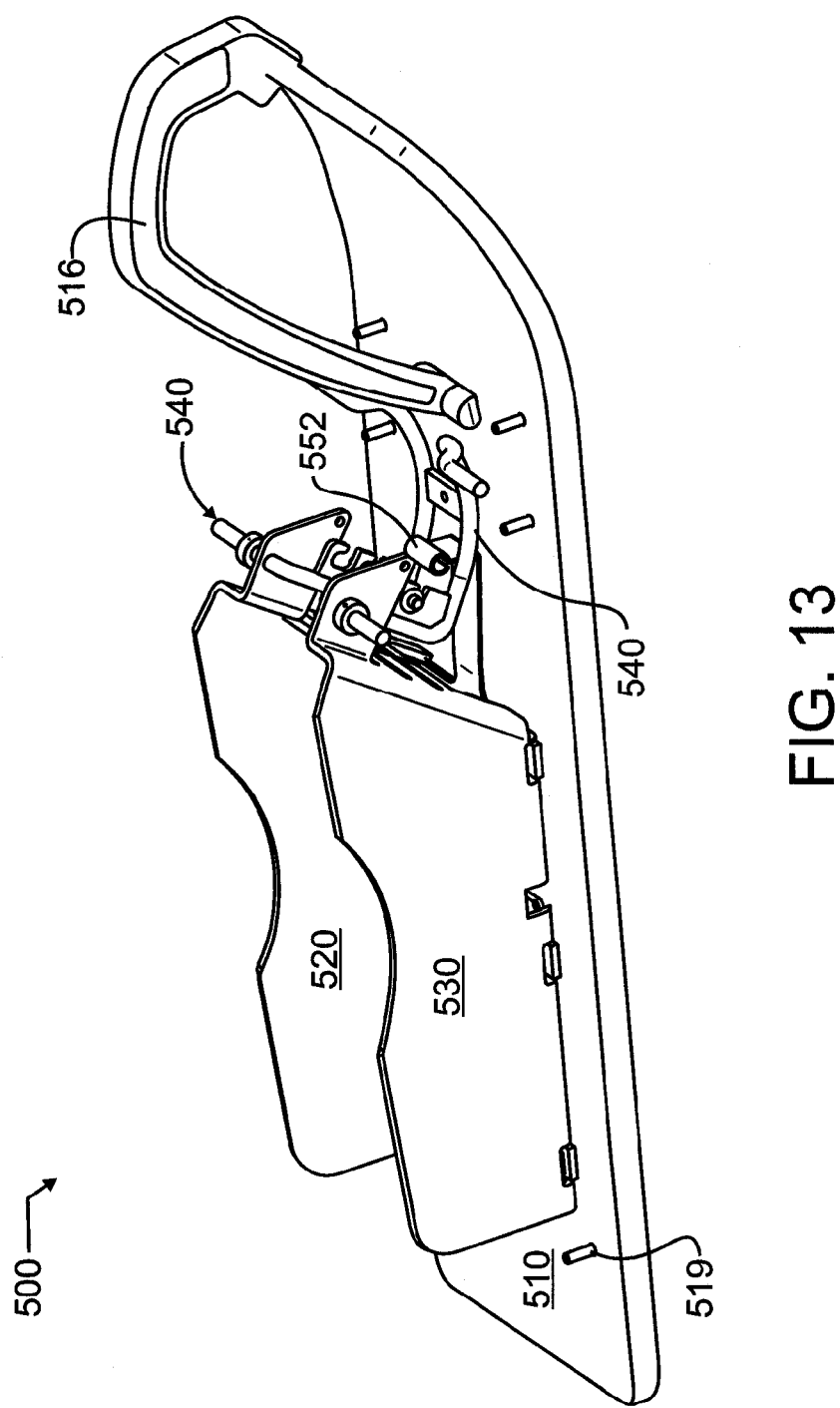
FIGS. 13-16 illustrate a fifth alternative embodiment quick-release All-Terrain Vehicle (ATV) ski designed in accord with the teachings of the present invention from projected, top plan, side elevational, and enlarged side sectional views, respectively.
Figure 14:
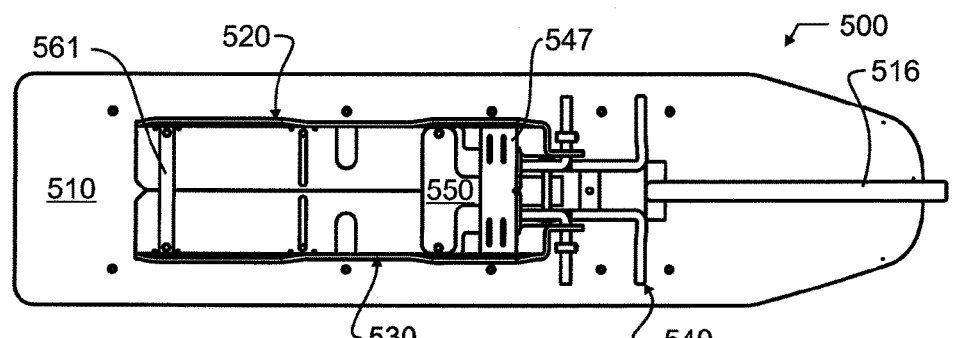
Figure 15:
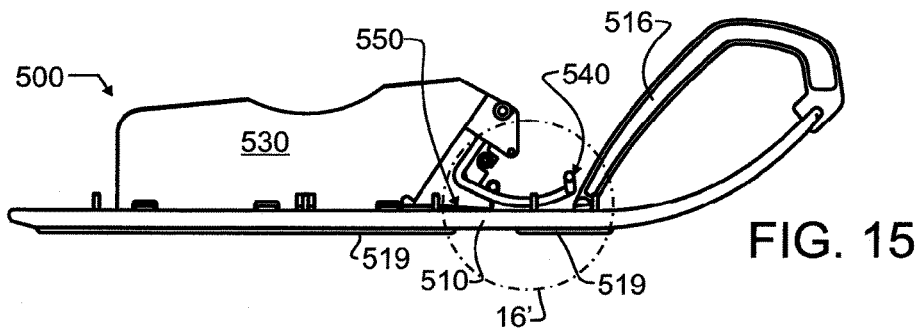

FIG. 9 illustrates a second alternative embodiment ATV ski 200 from side view. In this alternative embodiment, prior art ATV track 208, drive wheel 205, and bogie or idler wheels 206, 207 are mounted to all four wheels, as is known in the art. However, when the front tracks are not necessary or desired to operate, the ATV will be taken out of four wheel drive. This will increase fuel economy, and also reduce the wear and tear on the four wheel drive train. Instead of running or turning track 208, a ski 210 is preferably strapped onto the track, as illustrated in FIG. 9. Ski 210 may, though not necessarily, be slightly conformal and of sufficient length to elevate on both the front and rear ends when attached. At the fore end 212 and aft end 213 of ski 210 there are provided hook and eyes 262. A strap 260 and ratchet 240, similar to strap 60, 160 used in the embodiments of FIGS. 1 and 8, is coupled to hook and eyes 262 to secure ski 210 to track 208.

The ski 210 may alternatively be rigid and pointed, similar or even identical to the preferred embodiment ski 1, if so desired. Furthermore, it is contemplated herein that ski 210 be of length greater than that required to wrap about track 208. In one conceived embodiment, ski-shaped wheel support 10 may be used, and wheel receivers of very much less vertical height than receivers 20, 30 may be used to provide sides about track 208. Where desired, a slightly conformal ski can be laid flat on the ground, and the track driven thereupon. Next, the strap can be attached and tensioned, thereby causing the conformal ski to flex and take the shape of the track, meaning it will be raised at the front and back.

Noteworthy in this embodiment is the ability of ski 210 to be packed when not in use into a relatively small space. Depending upon preferences, ski 210, which operatively serves as a wheel support, may be either laid flat and stacked with the second ski, or the two skis may be coiled into a small roll. This facilitates the storage and transport of the skis when not in use.

FIG. 10 illustrates a third alternative embodiment quick-release All-Terrain Vehicle (ATV) ski 300 designed in accord with the teachings of the present invention from projected view. This embodiment incorporates an off-the-shelf ratcheting tie-down strap 360 incorporating a ratchet 364 into a bolt or pin 362 provided at the front of the receivers 320, 330.

FIGS. 11 and 12 illustrate a fourth alternative embodiment quick-release All-Terrain Vehicle (ATV) ski 400 designed in accord with the teachings of the present invention from projected and side elevational views, respectively. In this embodiment, brace 416 has been provided with a T-bar 418 that is folded vertically into a U-shape, through which a pin 450 may pass to secure tire clamp 440 in the locked down position. This pin 450 provides an alternative locking method to locking pin 50 illustrated in FIG. 1.

Figure 16:
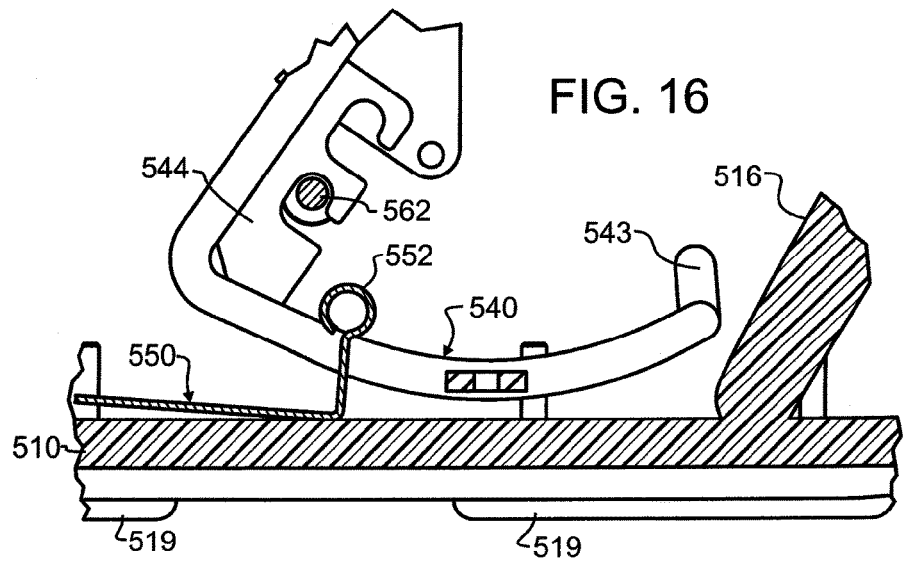

FIGS. 13-16 illustrate a fifth alternative embodiment quick-release All-Terrain Vehicle (ATV) ski 500 designed in accord with the teachings of the present invention from projected, top plan, side elevational, and enlarged side sectional views, respectively. The side section view of FIG. 16 is taken along line 16' of FIG. 15. In this embodiment, brace 516 is affixed to or may even be integral with ski 510. A generally T-shaped locking member 550 is coupled at the top of the T to receivers 520, 530, visible in FIGS. 14 and 15. Distal to the top of the T is a tube 552 that is open transverse to ski 510. Tube 552 provides a coupling location for a pin, which might for exemplary purposes be a pin similar to pin 450. By passing such a pin through, tire clamp 540 will be held in the locked and over-center position. In addition, optional wear bars 519 may be provided underneath ski 510, preferably from a particularly durable material such as iron or steel. These wear bars 519 will preferably be removably affixed to ski 510, such that when they wear away, they may be replaced with new sacrificial wear bars, without requiring replacement of the entire ski assembly.

At the front of receivers 520, 530, and simultaneously serving to couple them together and provide a forward stop is forward end plate 547, which preferably has a plurality of slots therein to accommodate variable width between receivers. Adjacent the rear of receivers 520, 530 is rear cross strap 561, which provides an alternative embodiment way to anchor strap 60 rather than the holes 38 illustrated in FIG. 1. Rear cross strap 561 may, for exemplary purposes only and not solely limiting thereto, pass through a terminating loop in strap 60, and then be bolted onto receivers 520, 530 to securely attach strap 60 distal to the over-center clamp 540.

An alternative embodiment pin receiver 544 is also illustrated, which has two notches capable of receiving pin 562 into either one of the two notches. These notches provide a simple adjustment for different tire diameters without having to change the length of strap 60, and without necessitating the plurality of holes 28, 38 illustrated in the first embodiment ski 1.

Figure 17:
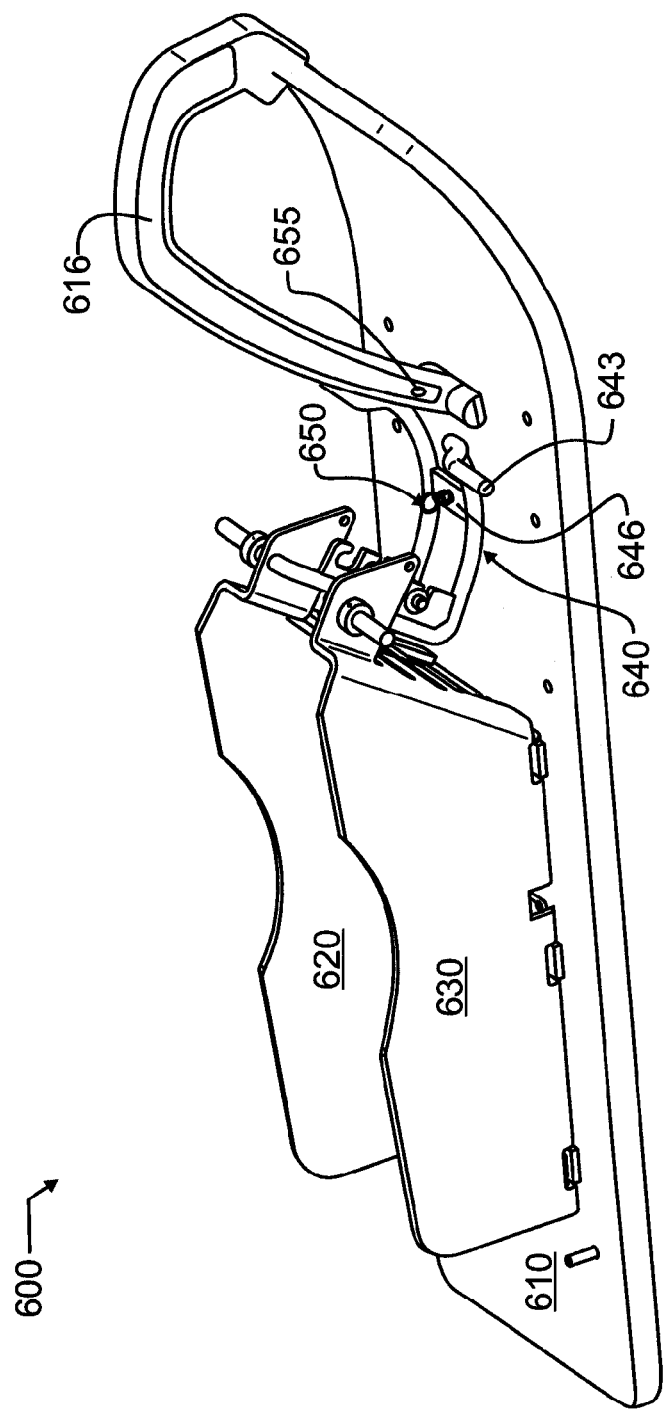

FIGS. 17 and 18 illustrate a sixth alternative embodiment quick-release All-Terrain Vehicle (ATV) ski 600 designed in accord with the teachings of the present invention from projected and enlarged side sectional views, respectively. As illustrated therein, a locking ring pin 650 may be used to hold tire clamp 640 in the locked, over-center position. A securing plate 646 with a hole formed centrally therein spans the arms of tire clamp 640, and preferably aligns with a ring pin coupling embedded or formed into wheel support 610. The ring pin and ring pin coupling can comprise any of a variety of known fasteners, such as a threaded coupling, but more preferably comprising a spring ball and detent arrangement that holds pin 650 down and within securing plate 646.

Within ATV ski 600, a further alternative embodiment locking mechanism is provided, through the provision of hole 655 in brace 616. Through hole 655 a pin such as pin 450 may pass. With appropriate placement of hole 655 in brace 616 relative to tire clamp 640, and as best understood from FIG. 18, when clamp 640 swings forward, rotating counterclockwise, handles 43 will collide with the pin, preventing clamp 640 from rotating past center until the pin is removed from hole 655.

Figure 19:
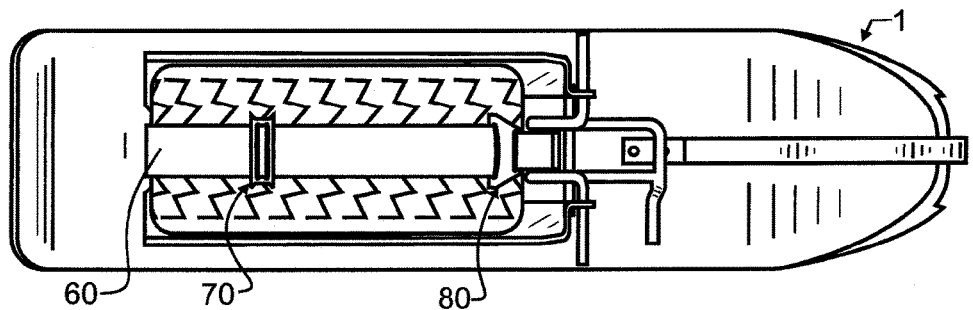
FIG. 19 illustrates the preferred embodiment quick-release All-Terrain Vehicle (ATV) ski of FIG. 1 in further combination with a preferred strap adjuster and preferred strap coupler from a top plan view.
Figure 20:
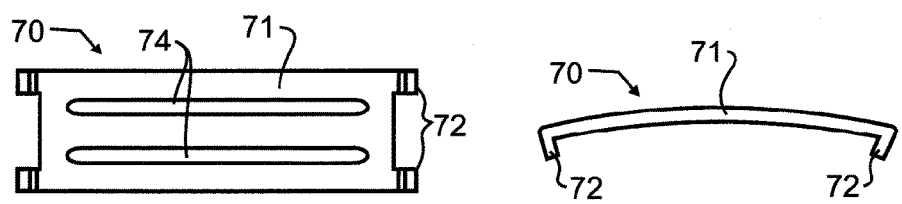
FIGS. 20 and 21 illustrate the preferred strap adjuster of FIG. 19 from a bottom plan view and right side view, respectively.
Figure 21:
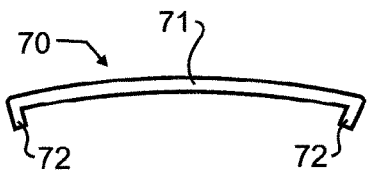
Figure 22:
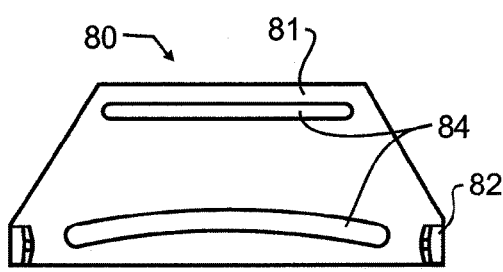
FIGS. 22 and 23 illustrate the preferred strap coupler of FIG. 19 from a bottom plan view and right side view, respectively.
Figure 23:
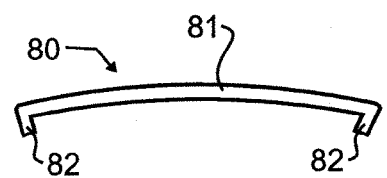

FIG. 19 illustrates the preferred embodiment quick-release All-Terrain Vehicle (ATV) ski 1 of FIG. 1 in further combination with a preferred strap adjuster 70 and preferred strap coupler 80. In accord with the teachings of the present invention, strap adjuster 70 and strap coupler 80 are each provided with prongs or teeth 72, 82 respectively. These teeth 72, 82 engage with tire 5 when clamp 40 is used to tighten strap 60 thereabout. The teeth 72, 82 help to ensure that strap 60 stays engaged with and circumscribes tire 5. Strap adjuster 70, shown separately in FIGS. 20 and 21, has a slightly arched body 71 with a pair of spaced slots 74 formed there through. These slots 74 define a path through which strap 60 may pass in a manner as is known in the prior art, allowing the length of strap 60 to be adjusted or varied. Strap coupler 80 is illustrated in FIGS. 22 and 23, and has a pair of slots 84 formed in slightly arched body 81. Each slot provides a connection through which a strap segment may pass and terminate. This allows straps of varying sizes to be used on either side of strap coupler 80. Most preferably, strap adjuster 760 will be located more distal from clamp 40, while strap coupler 80 will be located relatively more adjacent to clamp 40. By spacing strap adjuster 70 and strap coupler 80, there remain only relatively short sections of strap 60 that are less securely anchored to tire 5.

From the foregoing figures and description, several additional features and options become more apparent. First of all, the preferred and alternative embodiments may be manufactured from a variety of materials, including metals, resins and plastics, ceramics or cementitious materials, or even combinations, laminates or composites of the above. The specific material used may vary, though special benefits are attainable if several important factors are taken into consideration. First, the skis will encounter large impact forces. It is therefore preferable that all materials are sufficiently tough and durable to not fracture, even when great forces are applied thereto. By using partially resilient or elastomeric materials, there is a dampening of energy in the event of impact with an object. In addition, the skis will encounter snow, ice, mud, and other materials that will undoubtedly tend to abrade the ski bottoms. As noted herein above, preferred materials include steel, Ultra-High Molecular Weight (UHMW) polyethylene, fiberglass composites, and other materials that combine fracture resistance with reasonable abrasion resistance. In addition, the tire brackets may be similarly fabricated, though preferred materials are steel and aluminum.

While the foregoing details what is felt to be the preferred and additional alternative embodiments of the invention, no material limitations to the scope of the claimed invention are intended. The variants that would be possible from a reading of the present disclosure are too many in number for individual listings herein, though they are understood to be included in the present invention. For exemplary purposes only, and not solely limiting thereto, while the illustrated preferred and alternative embodiments most preferably couple specifically with an ATV, these embodiments will have application to other vehicles as well, which should be apparent and so which are considered to be incorporated herein. Further, features and design alternatives that would be obvious to one of ordinary skill in the art are considered to be incorporated also. The scope of the invention is set forth and particularly described in the claims herein below.

We claim:

1. A quick-release ATV ski, comprising:
   a ski-shaped wheel support;
   a pair of wheel receivers extending longitudinally along and rising from said ski-shaped wheel support and spaced laterally from each other to define a wheel cage;
   a strap anchor adjacent a first end of said wheel cage;
   an over-center clamp adjacent a second end of said wheel cage distal to said first end;
   a strap coupled between said strap anchor and said over-center clamp;
   a removable lock positively engaging said over-center clamp and thereby preventing accidental release of said over-center clamp; and
   a strap adjuster having:
      a body;
      a pair of spaced slots formed through said body and through which said strap passes and configured to allowing a length of said strap to be adjusted; and
      teeth coupled with and extending from said body and configured to engage with a wheel retained within said ski-shaped wheel support.

2. The quick-release ATV ski of claim 1, wherein said pair of wheel receivers are spaced laterally from each other by an adjustable distance.

3. The quick-release ATV ski of claim 1, wherein said pair of wheel receivers further comprise side walls and at least one front wheel stop.

4. The quick-release ATV ski of claim 1, wherein said pair of wheel receivers and said ski-shaped wheel support define a drive-in wheel cage.

5. The quick-release ATV ski of claim 1, further comprising a plurality of holes spaced varying distances from said over-center clamp, each serving as an available receiver for said strap anchor.

6. The quick-release ATV ski of claim 1, further comprising a strap coupler coupled with said strap intermediate between said strap adjuster and said over-center clamp, said strap coupler having:
   a coupler body;
   a pair of spaced slots formed through said coupler body and through which said strap passes and configured to allowing a length of said strap to be adjusted; and
   coupler teeth coupled with and extending from said coupler body and configured to engage with a wheel retained within said ski-shaped wheel support.

7. In combination, an ATV endless track, a ski, and a tensioning member,
   wherein said ATV endless track is uncoupled from a rotary drive and defines a ground contact region between at least two track wheels,
   wherein said ski is immediately adjacent to and covering said ATV endless track ground contact region and thereby isolates said ATV endless track ground contact region from direct contact with a ground surface, and
   wherein said tensioning member retains said ski in position immediately adjacent to and covering said ATV endless track and between said ATV endless track and said ground surface.

8. The combination ATV endless track, ski, and tensioning member of claim 7, further comprising a pair of track receivers extending longitudinally along and rising from said ski and spaced laterally from each other to define a track cage.

9. The combination ATV endless track, ski, and tensioning member of claim 7, wherein said ski is in direct contact with said ATV endless track ground contact region.

10. The combination ATV endless track, ski, and tensioning member of claim 7, wherein said ski is conformal.

11. The combination ATV endless track, ski, and tensioning member of claim 10, wherein said ski is adapted to roll into a storage configuration.

12. The combination ATV endless track, ski, and tensioning member of claim 10, wherein said conformal ski extends more fore and more aft than said ATV endless track ground contact region and rises both fore and aft therefrom.

13. The combination ATV endless track, ski, and tensioning member of claim 12, wherein said ski is provided with at least one of a hook and eye, and said tensioning member is provided with another of said hook and eye and engages with said at least one of said ski hook and eye.

* * * * *